US009849868B2

United States Patent
Sakaguchi

(10) Patent No.: US 9,849,868 B2
(45) Date of Patent: Dec. 26, 2017

(54) VEHICLE CONTROL DEVICE AND VEHICLE CONTROL METHOD

(71) Applicant: FUJI JUKOGYO KABUSHIKI KAISHA, Tokyo (JP)

(72) Inventor: Shinichi Sakaguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/054,154

(22) Filed: Feb. 26, 2016

(65) Prior Publication Data

US 2016/0251015 A1    Sep. 1, 2016

(30) Foreign Application Priority Data

Feb. 27, 2015  (JP) ................. 2015-038604

(51) Int. Cl.
*B60W 30/14* (2006.01)
*B60W 10/06* (2006.01)
*B60W 10/08* (2006.01)
*B60W 10/184* (2012.01)
*B60W 30/09* (2012.01)
*B60W 30/188* (2012.01)
*B60W 20/11* (2016.01)

(52) U.S. Cl.
CPC ........... *B60W 10/06* (2013.01); *B60W 10/08* (2013.01); *B60W 10/184* (2013.01); *B60W 20/11* (2016.01); *B60W 30/09* (2013.01); *B60W 30/188* (2013.01); *B60W 2420/42* (2013.01); *B60W 2520/10* (2013.01); *B60W 2540/10* (2013.01); *B60W 2550/302* (2013.01); *B60W 2550/308* (2013.01); *B60W 2710/083* (2013.01); *Y02T 10/6286* (2013.01)

(58) Field of Classification Search
USPC ....... 701/70, 93, 96, 301; 180/170; 340/435, 340/903
See application file for complete search history.

(56) References Cited

U.S. PATENT DOCUMENTS 5,173,859 A * 12/1992 Deering ............. B60K 31/0008
                                                    180/271
6,622,810 B2 * 9/2003 Labuhn .............. B60K 31/0008
                                                    180/169

(Continued)

FOREIGN PATENT DOCUMENTS

| JP | S63-78300 A   | 4/1988  |
| JP | 2007-269307 A | 10/2007 |

*Primary Examiner* — Richard Goldman
(74) *Attorney, Agent, or Firm* — Chip Law Group

(57) ABSTRACT

A vehicle control device includes a standard inter-vehicle distance setting module that sets a standard inter-vehicle distance in accordance with a velocity of a subject vehicle that is equipped with the vehicle control device, an inter-vehicle distance measuring module that measures an inter-vehicle distance between the subject vehicle and a preceding vehicle, an effectiveness ratio setting module that sets an effectiveness ratio on the basis of an inter-vehicle distance difference obtained by subtracting the standard inter-vehicle distance from the inter-vehicle distance, the effectiveness ratio indicating a proportion of an amount of an accelerator operation by a driver to be reflected on a drive control, and a drive control module that performs the drive control on the subject vehicle on the basis of the effectiveness ratio.

13 Claims, 9 Drawing Sheets

(56) References Cited

U.S. PATENT DOCUMENTS

| | | | | |
|---|---|---|---|---|
| 6,985,805 B2* | 1/2006 | Sudou | ............... | B60K 31/0008 180/170 |
| 7,698,049 B2* | 4/2010 | Whitney | ............... | F02D 31/002 123/350 |
| 2002/0032513 A1* | 3/2002 | Faye | ............... | B60C 23/0408 701/93 |
| 2002/0169538 A1* | 11/2002 | Yamamura | ............... | B60K 31/0008 701/96 |
| 2003/0204299 A1* | 10/2003 | Waldis | ............... | B60K 31/0008 701/96 |
| 2004/0254715 A1* | 12/2004 | Yamada | ............... | G01C 21/26 701/117 |
| 2005/0240333 A1* | 10/2005 | Bauerle | ............... | F02D 41/021 701/93 |
| 2007/0213916 A1 | 9/2007 | Sugano et al. | | |
| 2010/0179719 A1* | 7/2010 | Kimura | ............... | B60K 26/021 701/29.1 |
| 2010/0280729 A1* | 11/2010 | Samsioe | ............... | B60T 7/22 701/93 |
| 2011/0251771 A1* | 10/2011 | Takami | ............... | B60K 31/0008 701/96 |
| 2012/0078484 A1* | 3/2012 | Kato | ............... | B60W 30/143 701/96 |
| 2013/0116909 A1* | 5/2013 | Shida | ............... | B60W 30/16 701/96 |
| 2013/0151058 A1* | 6/2013 | Zagorski | ............... | B60W 30/09 701/23 |
| 2014/0074373 A1* | 3/2014 | Livshiz | ............... | F02D 41/1401 701/102 |
| 2014/0316681 A1* | 10/2014 | Whitney | ............... | F02D 41/221 701/108 |
| 2015/0039206 A1* | 2/2015 | Storch | ............... | F02D 28/00 701/103 |
| 2015/0134225 A1* | 5/2015 | Kinugawa | ............... | B60W 30/16 701/96 |
| 2015/0314771 A1* | 11/2015 | Dextreit | ............... | B60W 50/082 701/22 |
| 2016/0176403 A1* | 6/2016 | Weston | ............... | B60W 30/162 701/96 |
| 2016/0251015 A1* | 9/2016 | Sakaguchi | ............... | B60W 30/162 701/96 |

* cited by examiner

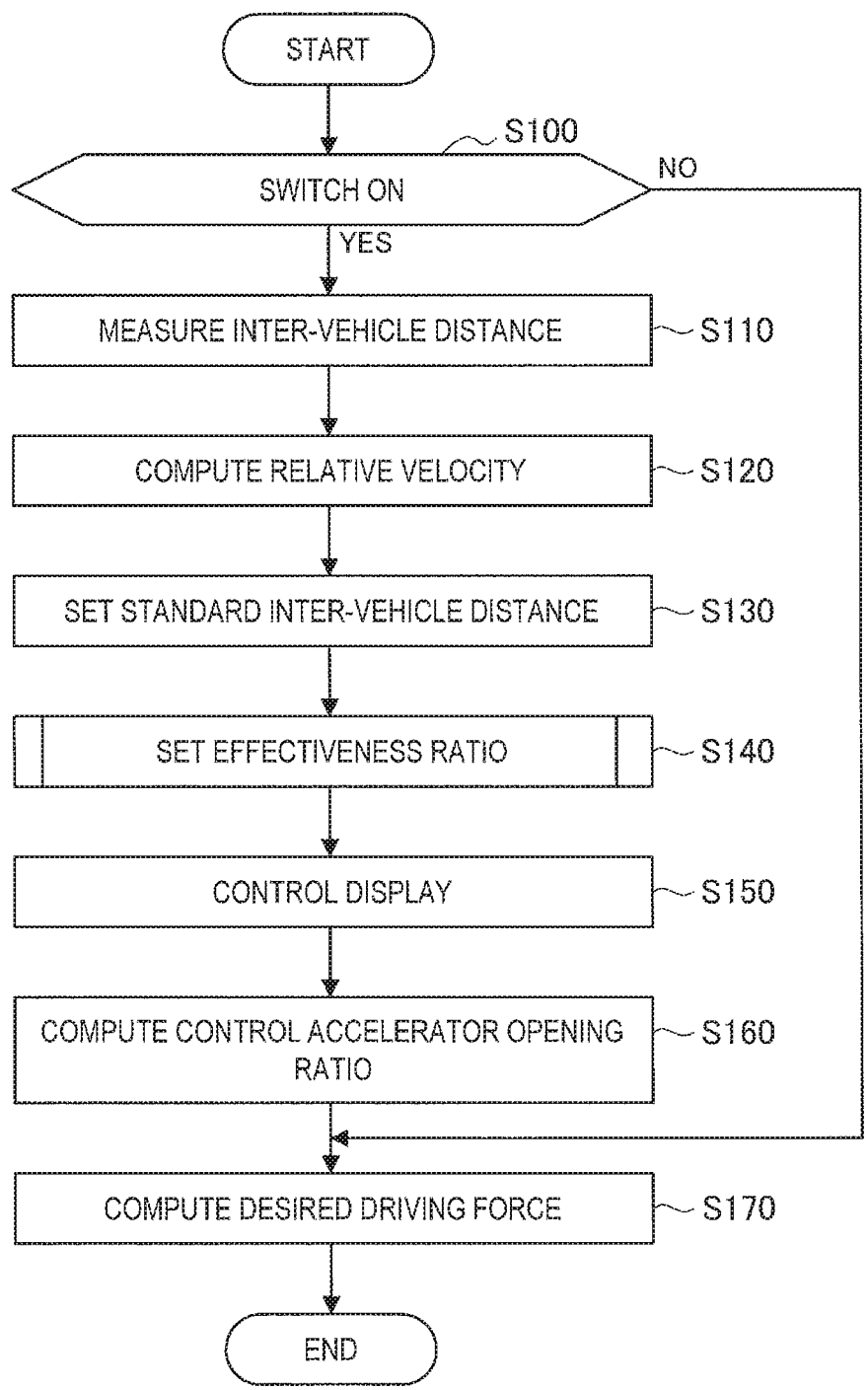

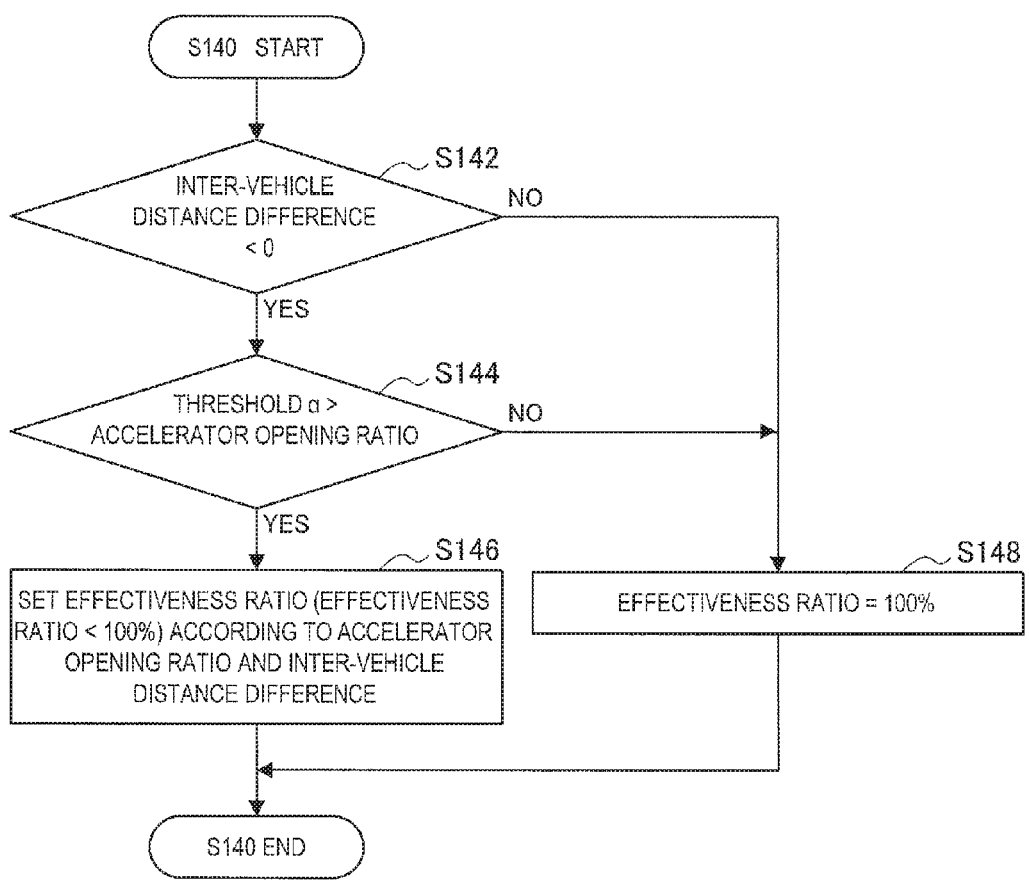

VEHICLE CONTROL DEVICE AND VEHICLE CONTROL METHOD

CROSS-REFERENCE TO RELATED APPLICATIONS

The present application claims priority from Japanese Patent Application No. 2015-038604 filed on Feb. 27, 2015, the entire contents of which are hereby incorporated by reference.

BACKGROUND

1. Technical Field

The present disclosure relates to a vehicle control device and a vehicle control method.

2. Related Art

There is a conventionally known technology of, for example, detecting a preceding vehicle ahead of a vehicle to which the technology is applied (which will be referred to as subject vehicle), and activating an alarm and automatically controlling the brake to prevent the subject vehicle from bumping against or colliding with the detected preceding vehicle. For example, Japanese Unexamined Patent Application Publication No. S63-78300 discloses a collision preventing device that raises an alarm for a driver on the basis of the velocity of the subject vehicle, the inter-vehicle distance to a preceding vehicle, and the preceding vehicle's brake lights that are switched on and off.

The technology, however, causes the sudden deceleration of the subject vehicle due to a braking operation by the alarmed driver or automatic brake control. The sudden deceleration of the vehicle converts the kinetic energy of the vehicle into thermal energy, and at least part of the thermal energy is lost. It is thus problematic that the sudden deceleration of the vehicle would decrease the energy consumption efficiency of the vehicle as compared with slow deceleration. In addition, a driver is expected to accelerate the vehicle to keep on driving after decelerating the vehicle, but in general, the torque transmission efficiency becomes lower when the vehicle is accelerated than when the vehicle is maintained at constant velocity. Consequently, the energy consumption efficiency of the vehicle may decrease.

SUMMARY OF THE INVENTION

In view of the problem, the present disclosure provides a novel and improved vehicle control device and vehicle control method that can increase the energy consumption efficiency of a vehicle by preventing repeated acceleration and deceleration.

An aspect of the present disclosure provides a vehicle control device including: a standard inter-vehicle distance setting module that sets a standard inter-vehicle distance in accordance with a velocity of a subject vehicle that is equipped with the vehicle control device; an inter-vehicle distance measuring module that measures an inter-vehicle distance between the subject vehicle and a preceding vehicle; an effectiveness ratio setting module that sets an effectiveness ratio on the basis of an inter-vehicle distance difference obtained by subtracting the standard inter-vehicle distance from the inter-vehicle distance, the effectiveness ratio indicating a proportion of an amount of an accelerator operation by a driver to be reflected on a drive control; and a drive control module that performs the drive control on the subject vehicle on the basis of the effectiveness ratio.

The effectiveness ratio setting module may set the effectiveness ratio at less than 100% when the inter-vehicle distance difference has a negative value.

The effectiveness ratio setting module may set the effectiveness ratio at 100% when an accelerator opening ratio is greater than or equal to a value set in advance in accordance with the inter-vehicle distance difference.

The vehicle control device may further include: a relative velocity computing module that computes a relative velocity between the subject vehicle and the preceding vehicle. The standard inter-vehicle distance setting module may set the standard inter-vehicle distance in accordance with the velocity of the subject vehicle and the relative velocity.

The standard inter-vehicle distance setting module may set the standard inter-vehicle distance in a manner that the standard inter-vehicle distance increases as the velocity of the subject vehicle is exceeding a velocity of the preceding vehicle.

The drive control module may reflect the effectiveness ratio on at least any one of the accelerator opening ratio, a desired driving force, a desired engine speed, and a desired acceleration to perform the drive control.

The vehicle control device may further include: a display control module that causes, when the subject vehicle includes a display that displays an information, the display to display an information on at least any one of the standard inter-vehicle distance, the inter-vehicle distance difference, and the effectiveness ratio.

The effectiveness ratio setting module may set the effectiveness ratio by using the inter-vehicle distance difference as a parameter in a manner that the effectiveness ratio weakly increases.

The standard inter-vehicle distance setting module may set the standard inter-vehicle distance by using the velocity of the subject vehicle as a parameter in a manner that the standard inter-vehicle distance weakly increases.

The inter-vehicle distance measuring module may measure the inter-vehicle distance on the basis of an information on images captured by a camera.

An aspect of the present disclosure provides a vehicle control method including: setting a standard inter-vehicle distance in accordance with a velocity of a subject vehicle to which the vehicle control method is applied; measuring an inter-vehicle distance between the subject vehicle and a preceding vehicle; setting an effectiveness ratio in accordance with an inter-vehicle distance difference and an acceleration opening ratio, the effectiveness ratio indicating a proportion of an output to a user input, the inter-vehicle distance difference being obtained by subtracting the inter-vehicle distance from the standard inter-vehicle distance; and performing a drive control on the subject vehicle on the basis of the effectiveness ratio.

BRIEF DESCRIPTION OF THE DRAWINGS

FIG. 9 is a flowchart illustrating the drive control processing according to the implementation; and FIG. 10 is a flowchart illustrating effectiveness ratio setting processing according to the implementation.

DETAILED DESCRIPTION

Figure 1:
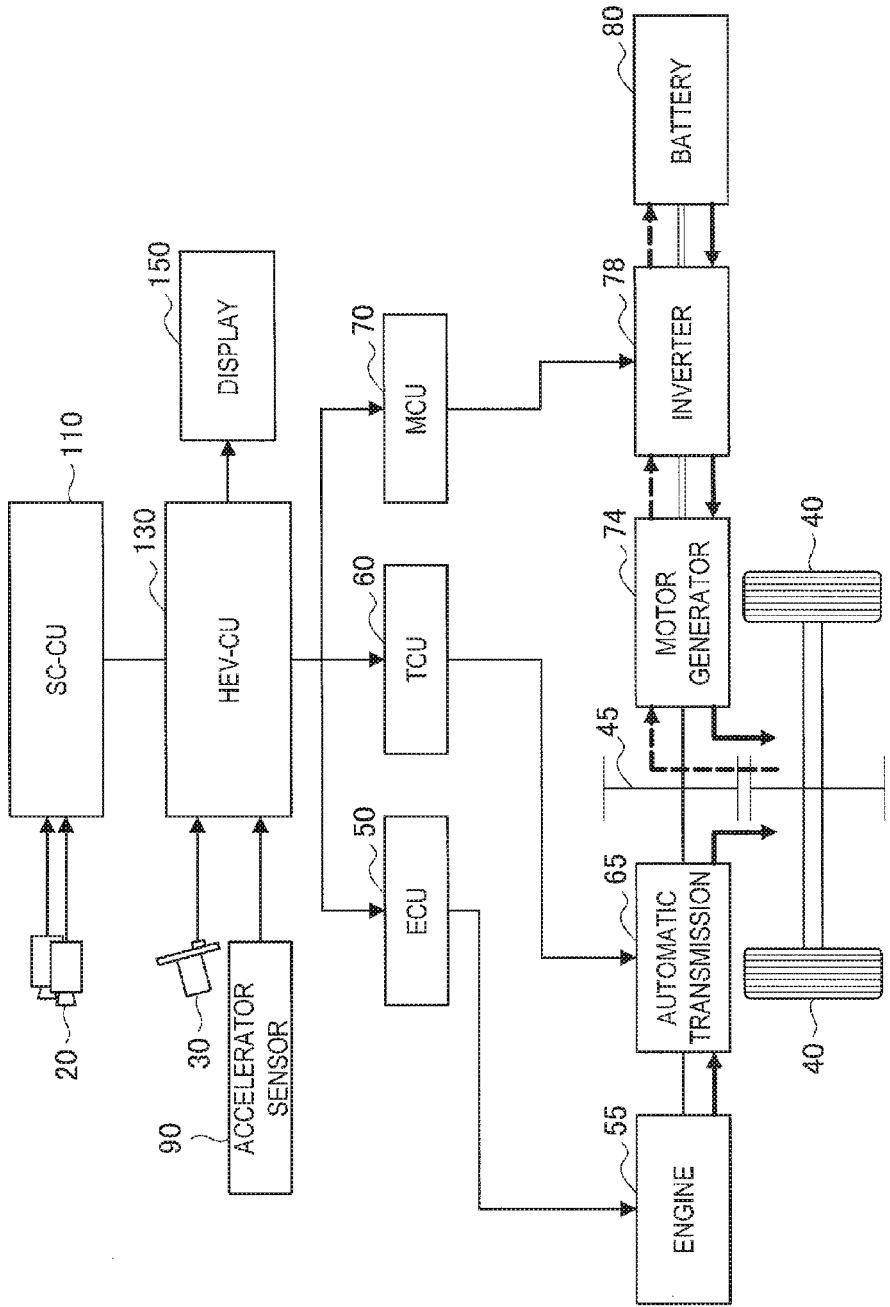
FIG. 1 is a block diagram illustrating a basic configuration of a vehicle according to an implementation of the present disclosure.

Hereinafter, a preferred implementation of the present disclosure will be described in detail with reference to the appended drawings. Note that, in this specification and the appended drawings, structural elements that have substantially the same function and structure are denoted with the same reference numerals, and repeated description of these structural elements is omitted.

1. OVERVIEW 1-1. Basic Configuration of Power System

First of all, the basic configuration of the power system of a vehicle according to an implementation of the present disclosure will be described with reference to FIG. 1. FIG. 1 schematically illustrates the basic system configuration of a vehicle 1 (subject vehicle) according to an implementation of the present disclosure. The vehicle 1 according to the present implementation is a hybrid vehicle (HEV) that includes an engine 55 and a motor generator 74 as the drive sources.

As illustrated in FIG. 1, the engine 55 is an internal combustion engine that uses, for example, gasoline as fuel to generate driving force, and the output side of the engine 55 is connected with an automatic transmission 65.

The motor generator 74 has the function of converting electrical energy into mechanical energy, and the function (regenerative function) of converting mechanical energy into electrical energy. Meanwhile, the motor generator 74 has a motor electricity generation driving mode in which an output of the engine 55 is absorbed and converted into electric power to charge a battery 80, and a regenerative brake mode in which deceleration energy that is discharged during deceleration as thermal energy is converted into electric power to charge the battery 80. The rotation of drive wheels 40 causes the motor generator 74 to generate electric power, and brake force is also generated against the drive wheels 40 in the regenerative brake mode.

The motor generator 74 is connected to the battery 80 via an inverter 78, which bidirectionally converts direct-current power and alternating-current power. The inverter 78 converts the voltage of the battery 80 into alternating voltage, and drives the motor generator 74 to cause the motor generator 74 to generate driving force. Meanwhile, the inverter 78 converts regenerative electric power generated by the motor generator 74 into direct voltage to charge the battery 80. That is to say, the motor generator 74 can switch the operations under the control of the inverter 78.

Driving force output from the engine 55 and the motor generator 74 is transmitted to the drive wheels 40 via a power transmission path that includes the automatic transmission 65 and a drive shaft 45. The automatic transmission 65 adjusts the driving force transmitted to the drive shaft 45 by switching a gear ratio. There is provided a clutch (not illustrated) between the engine 55 and the automatic transmission 65. Letting out the clutch disconnects the engine 55 from the power transmission path, and connects only the motor generator 74 with the drive wheels 40 as the power source. To the contrary, engaging the clutch connects the engine 55 with the power transmission path, and connects the engine 55 and the motor generator 74 with the drive wheels 40 as the power sources.

1-2. Basic Configuration of Electronic Control System

Next, the electronic control system that controls the power system of the vehicle 1 will be described. As illustrated in FIG. 1, the electronic control system includes control units that are connected with a communication bus (not illustrated) such as a controller area network (CAN). The engine 55, the automatic transmission 65, and the motor generator 74 are controlled with coordination control via these control units.

Each of the control units is equipped chiefly with a microcomputer, and includes an engine control unit (ECU) 50, an automatic transmission control unit (TCU) 60, a motor control unit (MCU) 70, an image processing unit (SC-CU) 110, and a hybrid control unit (HEV-CU) 130 in the present implementation.

These control units 50, 60, 70, 110, and 130 mutually exchange control information such as various operation values and control parameter information detected by various sensors via an in-vehicle network made of the communication bus, and perform drive control such as controlling the engine, the motor, and the automatic transmission.

For example, the SC-CU 110 receives signals of information on images captured by a stereo camera assembly 20. For example, the SC-CU 110 detects a preceding vehicle, computes the inter-vehicle distance between the subject vehicle and the preceding vehicle, and computes the relative velocity between the subject vehicle and the preceding vehicle on the basis of the information on the images captured by the stereo camera assembly 20.

Meanwhile, the HEV-CU 130 receives signals from a control switch 30, an accelerator sensor 90 that detects an acceleration operation by a driver (how much the driver pushes down the accelerator pedal: accelerator opening ratio), a brake sensor that detects a brake operation (how much the driver pushes down the brake pedal), and the like. For example, when the control switch 30 is on, the HEV-CU 130 according to the present implementation sets the effectiveness ratio indicating the proportion of the amount of an accelerator operation by a driver to be reflected on drive control on the basis of the inter-vehicle distance and the relative velocity computed by the SC-CU 110, and performs the drive control on the subject vehicle on the basis of the effectiveness ratio. The HEV-CU 130 according to the present implementation also generates a display signal for causing a display 150 to display various kinds of information.

The ECU 50, the TCU 60, and the MCU 70 respectively control the engine 55, the automatic transmission 65, and the inverter 78 of the motor generator 74. At least when drive control is performed, these ECU 50, TCU 60, and MCU 70 perform control on the basis of a request from the HEV-CU 130.

1-3. Overview of Operation

Next, the overview of an operation for drive control according to the present implementation will be described with reference to FIGS. 2 to 4.

(Conventional Drive Control)

Figure 2:
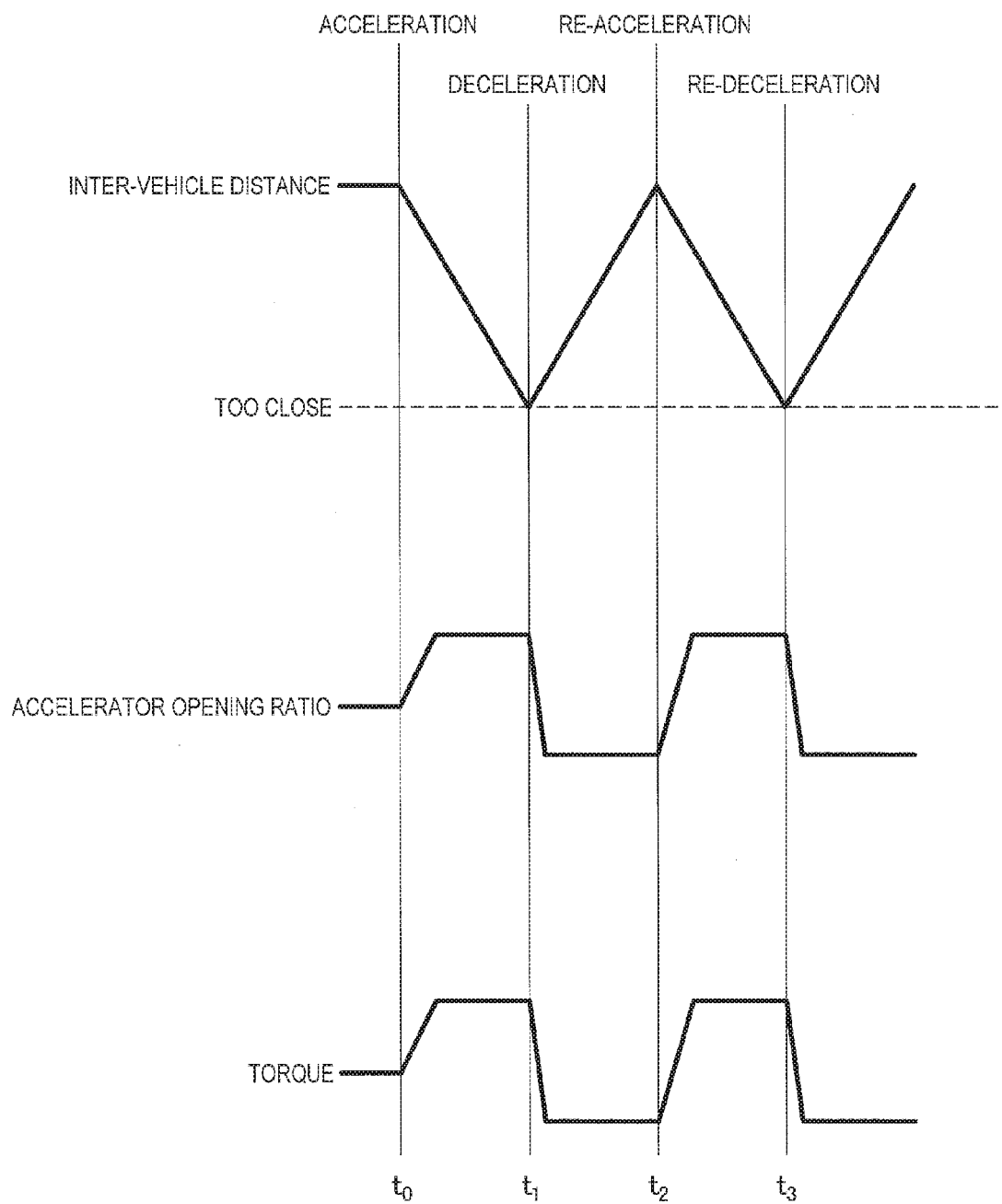
FIG. 2 is a time chart for describing an example of conventional drive control processing.

FIG. 2 illustrates an example of an operation of the vehicle 1 illustrated in FIG. 1 having the control switch 30 of the vehicle 1 turned off. When the control switch 30 is off, the HEV-CU 130 sets no effectiveness ratio, but performs the conventional drive control, under which the amount of an accelerator operation by a driver is directly (100%) reflected.

When the conventional drive control is performed, the amount of an accelerator operation by a driver is directly reflected on the drive control and the HEV-CU 130 computes the desired value of the torque (total torque of the output torque of the engine 55 and the output torque of the motor generator 74) according to the amount of the accelerator operation. For example, as the accelerator opening ratio is increasing from time to due to an accelerator operation by a driver as illustrated in FIG. 2, the torque increases with the increase in the accelerator opening ratio. The increase in the torque accelerates the vehicle 1, and decreases the inter-vehicle distance to a preceding vehicle.

As a result, the inter-vehicle distance to the preceding vehicle decreases, and depending on the driving skill of the driver, the subject vehicle comes so close to the preceding vehicle that the subject vehicle almost bumps against the preceding vehicle. In this case, the subject vehicle is decelerated by a brake operation by a driver or the above-described automatic brake control function to avoid bumping against the preceding vehicle (time $t_1$).

Too much deceleration increases the inter-vehicle distance too much, so that the driver accelerates the subject vehicle again to approach the preceding vehicle (time $t_2$). When the subject vehicle comes too close to the preceding vehicle as at the time $t_1$, the subject vehicle is decelerated again (time $t_3$).

For example, drivers having a poor driving skill and difficulty in maintaining an appropriate inter-vehicle distance drive a vehicle repeating acceleration and deceleration as discussed above, which may decrease the energy consumption efficiency of the vehicle as compared with a vehicle driven by drivers who maintain an appropriate inter-vehicle distance.

(Drive Control According to the Present Implementation)

Figure 3:
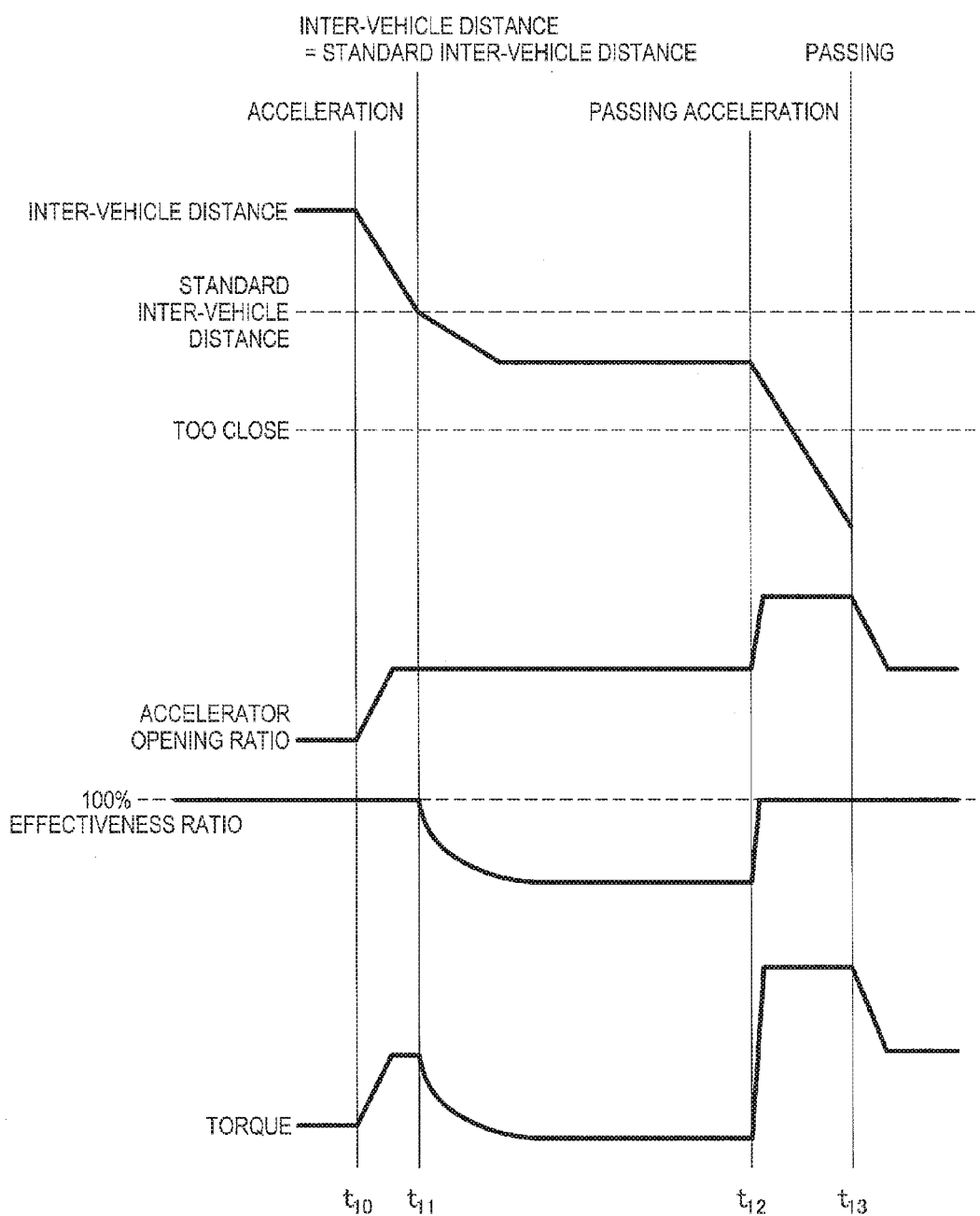
FIG. 3 is a time chart for describing an example of drive control processing according to the implementation.

FIG. 3 illustrates an example of an operation of the vehicle 1 illustrated in FIG. 1 having the control switch 30 of the vehicle 1 turned on. When the control switch 30 is on, the HEV-CU 130 sets the effectiveness ratio indicating the proportion of the amount of an accelerator operation by a driver to be reflected on drive control, and performs the drive control on the vehicle 1 on the basis of the effectiveness ratio.

The HEV-CU 130 sets, on the basis of the velocity of the subject vehicle and the relative velocity, a standard inter-vehicle distance in which suppression control is begun over the driving force, and computes the inter-vehicle distance difference by subtracting the standard inter-vehicle distance from the inter-vehicle distance in the present implementation. Furthermore, when the inter-vehicle distance difference is greater than or equal to 0 (the inter-vehicle distance is greater than or equal to the standard inter-vehicle distance), the HEV-CU 130 sets the effectiveness ratio at 100%. Meanwhile, when the inter-vehicle distance difference has a negative value (the inter-vehicle distance is less than the standard inter-vehicle distance), the HEV-CU 130 sets the effectiveness ratio at less than 100%. The HEV-CU 130 hereby controls the driving force when the inter-vehicle distance falls below the standard inter-vehicle distance. The standard inter-vehicle distance is set in accordance with the velocity of the subject vehicle and the relative velocity in the present implementation, resulting in a variation in the standard inter-vehicle distance in some cases. However, FIG. 3 illustrates an example in which the standard inter-vehicle distance is constant for brevity.

The HEV-CU 130 according to the present implementation reflects the effectiveness ratio on the accelerator opening ratio to compute a control accelerator opening ratio, and computes the desired value of the torque according to the control accelerator opening ratio.

For example, as the accelerator opening ratio is increasing from time $t_{10}$ due to an accelerator operation by a driver as illustrated in FIG. 3, the torque increases with the increase in the accelerator opening ratio because the effectiveness ratio remains 100% while the inter-vehicle distance is greater than or equal to the standard inter-vehicle distance. The increase in the torque accelerates the vehicle 1, and decreases the inter-vehicle distance to a preceding vehicle.

Figure 7:
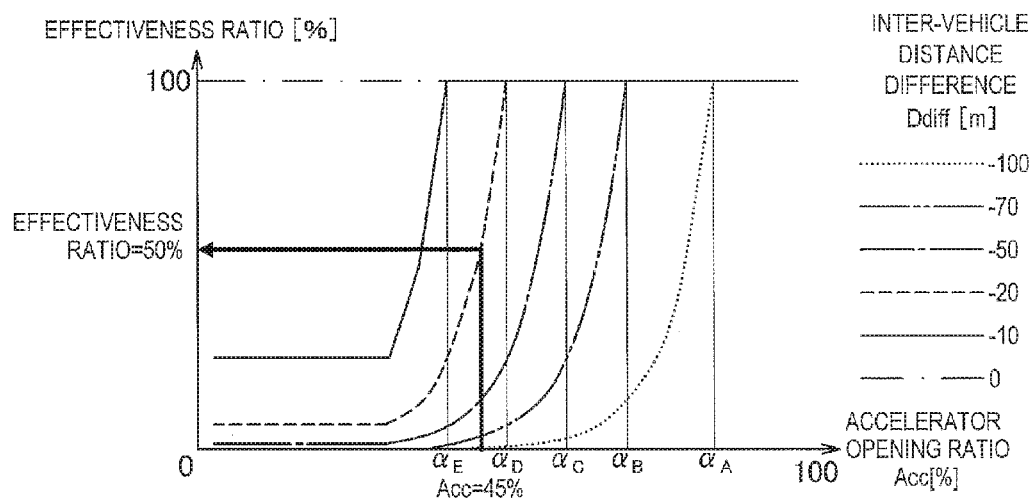
FIG. 7 illustrates a relationship between an accelerator opening ratio and an effectiveness ratio according to the implementation.

When the inter-vehicle distance between the vehicle 1 and the preceding vehicle is reduced to the standard inter-vehicle distance at time $t_{11}$, and still keeps on decreasing the HEV-CU 130 sets the effectiveness ratio at less than 100%. The HEV-CU 130 may set a smaller effectiveness ratio as the inter-vehicle distance is decreasing as compared with the standard inter-vehicle distance, for example, as illustrated in FIG. 7. The torque changes in accordance with the control accelerator opening ratio computed by multiplying the accelerator opening ratio by the effectiveness ratio in the present implementation, so that the driving force is suppressed and the torque changes in accordance with a change in the effectiveness ratio in spite of even the constant accelerator opening ratio as illustrated from the time $t_{11}$ to time $t_{12}$.

The HEV-CU 130 according to the present implementation may, for example, stop suppression of the driving force when a driver clearly intends to accelerate the vehicle. For example, when a driver accelerates the vehicle to pass a preceding vehicle (passing acceleration) as illustrated in FIG. 3 (time $t_{12}$ to $t_{13}$), the HEV-CU 130 may directly reflect the amount of the accelerator operation by the driver on drive control and compute the desired value of the torque by setting the effectiveness ratio at 100%.

Figure 4:
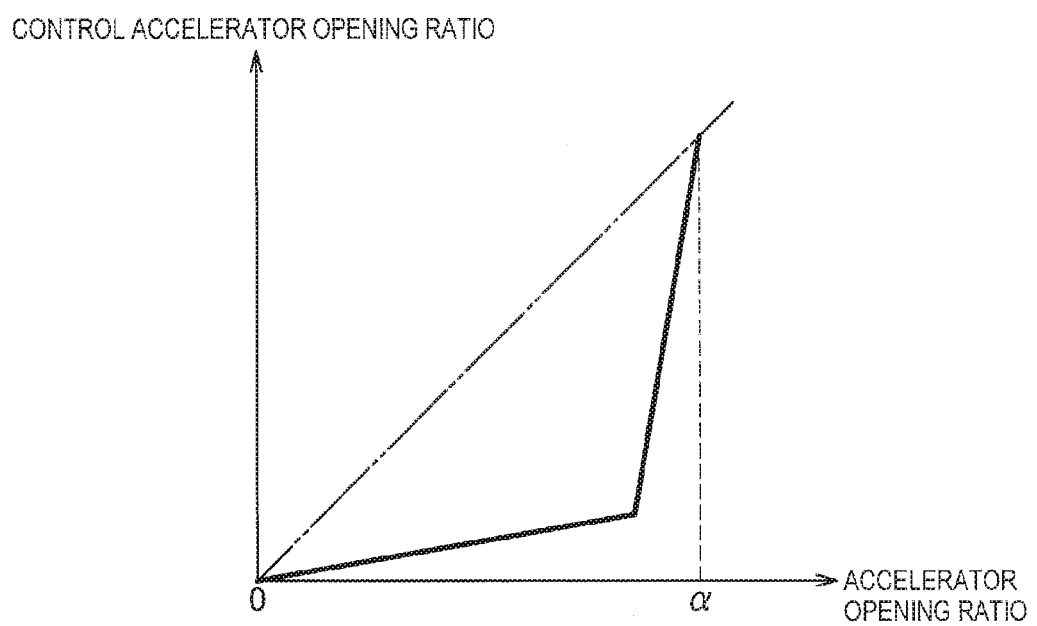
FIG. 4 illustrates a relationship between an accelerator opening ratio and a control accelerator opening ratio according to the implementation.

FIG. 4 schematically illustrates that the control accelerator opening ratio is set, and suppression of the driving force is stopped when a driver clearly intends to accelerate the vehicle. In FIG. 4, the solid line represents an example of a relationship between the accelerator opening ratio and the control accelerator opening ratio in which the inter-vehicle distance difference has a negative value, while the two-dot chain line represents a relationship between the accelerator opening ratio and the control accelerator opening ratio in which the effectiveness ratio remains 100%. Note that the control accelerator opening ratio is decided on the basis of the effectiveness ratio set, for example, in accordance with the velocity of the subject vehicle, the relative velocity, and the inter-vehicle distance in addition to the accelerator opening ratio, so that the relationship between the accelerator opening ratio and the control accelerator opening ratio is not necessarily constant. Thus, the solid line in FIG. 4 represents an example of the relationship between the accelerator opening ratio and the control accelerator opening ratio, and other relationships are also conceivable between the accelerator opening ratio and the control accelerator opening ratio.

For example, when the accelerator opening ratio is greater than or equal to a threshold $\alpha$ set in advance in accordance with the inter-vehicle distance difference, it may be determined that a driver clearly intends to accelerate the vehicle. That is to say, when the accelerator opening ratio is greater than or equal to the threshold α set in advance in accordance with an inter-vehicle distance as illustrated in FIG. 4, the HEV-CU 130 may set the effectiveness ratio at 100% and identify the accelerator opening ratio with the control accelerator opening ratio. Setting the effectiveness ratio in this way allows the vehicle to pass a preceding vehicle as illustrated from the time $t_{12}$ to the time $t_{13}$ in FIG. 3.

As described above, the drive control according to the present implementation adjusts torque and prevents repeated acceleration and deceleration in a manner that the subject vehicle does not come too close to a preceding vehicle, resulting in an increase in the energy consumption efficiency of the vehicle. When a driver clearly intends to accelerate the vehicle like passing acceleration, the HEV-CU 130 stops suppression of the driving force. Accordingly, the drivability is improved.

The basic configuration and the overview of the operation according to the present implementation have been described so far. The following sequentially describes, in detail, the configurations of the image processing unit (SC-CU 110) and the hybrid control unit (HEV-CU 130), which perform the above-described operation and attain the advantageous effects in the present implementation.

2. CONFIGURATION 2-1. Image Processing Unit

Figure 5:
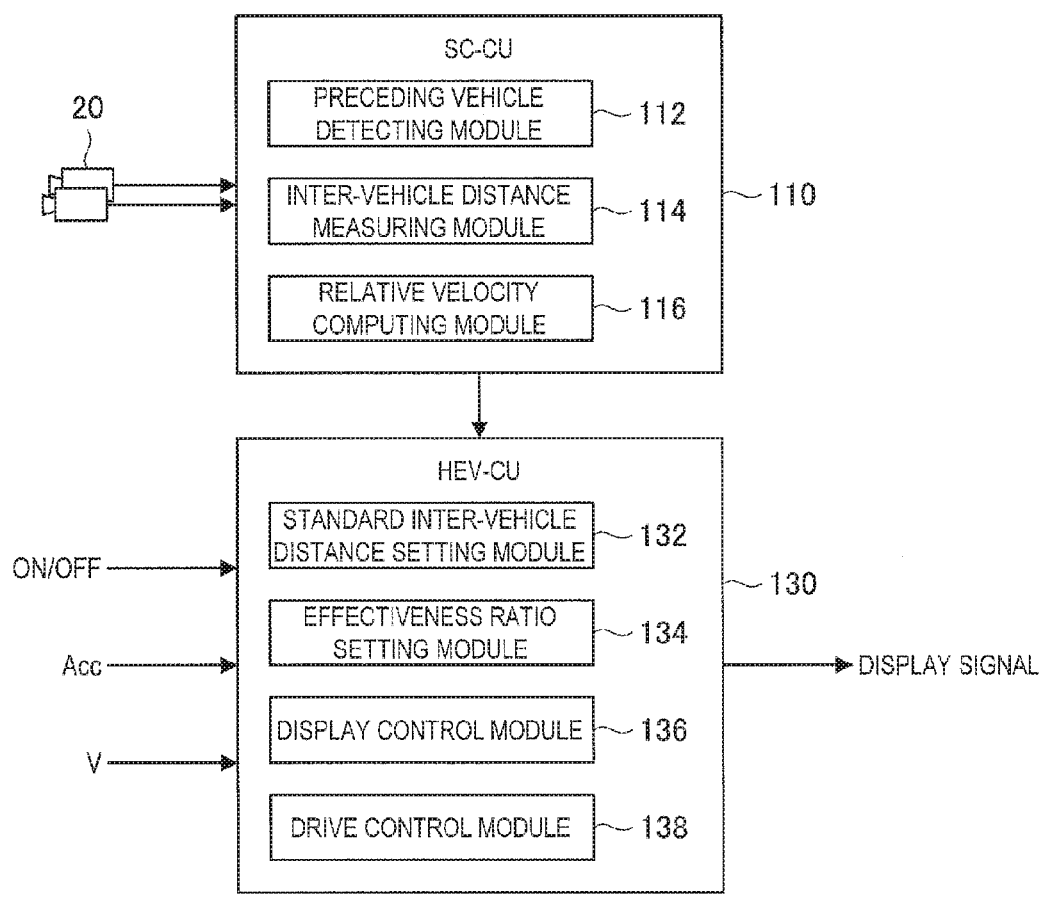
FIG. 5 illustrates configurations of an SC-CU and an HEV-CU according to the implementation.

As illustrated in FIG. 5, the SC-CU 110 receives information on captured images from the stereo camera assembly 20. The SC-CU 110 calculates, for example, the presence or absence of a preceding vehicle, the inter-vehicle distance to the preceding vehicle, and the relative velocity to the preceding vehicle on the basis of the images captured by the stereo camera assembly 20.

The stereo camera assembly 20 connected with the SC-CU 110 includes a pair of left and right CCD cameras that uses a solid-state image sensor such as a charge-coupled device (CCD). These left and right CCD cameras are spaced apart and attached to the front ceiling of the vehicle interior, and capture stereo images of an object outside the vehicle from different viewpoints. The stereo camera assembly 20 and the SC-CU 110 may be attached to the vehicle interior as an integrated unit.

The SC-CU 110 uses the principle of triangulation to generate distance information on the basis of the disparity between the positions corresponding to a pair of stereo images that are captured by the stereo camera assembly 20 and show the areas in the advancing direction of the subject vehicle. The SC-CU 110 further detects a preceding vehicle on the basis of the distance information. When a preceding vehicle is detected, the SC-CU 110 computes, for example, an inter-vehicle distance D between the subject vehicle and the preceding vehicle and relative velocity Vd between the subject vehicle and the preceding vehicle. A detection result indicating whether or not a preceding vehicle is detected, the computed inter-vehicle distance D, and the computed relative velocity Vd are output to the HEV-CU 130.

Specifically, as illustrated in FIG. 5, the SC-CU 110 according to the present implementation includes a preceding vehicle detecting module 112, an inter-vehicle distance measuring module 114, and a relative velocity computing module 116. Specifically, these modules are implemented by the microcomputer executing programs.

(Preceding Vehicle Detecting Module 112)

The preceding vehicle detecting module 112 detects the presence or absence of a preceding vehicle serving as a three-dimensional object. For example, the preceding vehicle detecting module 112 performs the well-known grouping processing on distance information generated from stereo images, and compares the distance information subjected to the grouping processing with three-dimensional object data set in advance to detect a preceding vehicle.

(Inter-Vehicle Distance Measuring Module 114)

When the preceding vehicle detecting module 112 detects a preceding vehicle, the inter-vehicle distance measuring module 114 measures the inter-vehicle distance D between the subject vehicle and the preceding vehicle on the basis of the stereo images (information on the captured images) captured by the stereo camera assembly 20. For example, the inter-vehicle distance measuring module 114 associates the detected preceding vehicle with the distance information generated from the stereo images to measure the inter-vehicle distance on the basis of the associated distance information.

(Relative Velocity Computing Module 116)

The relative velocity computing module 116 computes the relative velocity Vd between the subject vehicle and the preceding vehicle. For example, the relative velocity computing module 116 can compute the relative velocity Vd as the proportion of a change in the inter-vehicle distance D over time. Note that the relative velocity Vd is equal to the value obtained by subtracting the velocity of the subject vehicle from the velocity of the preceding vehicle in the present implementation. When the velocity of the preceding vehicle is higher than the velocity of the subject vehicle, the relative velocity Vd has a positive value. Meanwhile, when the velocity of the preceding vehicle is lower than the velocity of the subject vehicle, the relative velocity Vd has a negative value.

2-2. Hybrid Control Unit

The HEV-CU 130 controls the output torque of the engine 55, the gear ratio of the automatic transmission 65, and the output torque of the motor generator 74 via the ECU 50, the TCU 60, and the MCU 70 illustrated in FIG. 1 to perform drive control on the vehicle 1. Specifically, the HEV-CU 130 sets the effectiveness ratio indicating the proportion of the amount of an acceleration operation by a driver to be reflected on drive control with the control switch 30 turned on, and performs the drive control on the vehicle 1 on the basis of the effectiveness ratio in the present implementation. The HEV-CU 130 generates a display signal for causing the display 150 illustrated in FIG. 1 to display information, and outputs the generated display signal to the display 150.

Additionally, the control switch 30 is provided, for example, to the steering wheel of the vehicle 1, and switched on and off by a driver.

Specifically, as illustrated in FIG. 5, the HEV-CU 130 receives a detection result indicating whether or not a preceding vehicle is detected, the computed inter-vehicle distance D, and the computed relative velocity Vd from the SC-CU 110, and further receives, for example, an accelerator opening ratio Acc and the velocity V of the subject vehicle via the communication bus. As illustrated in FIG. 5, the HEV-CU 130 according to the present implementation includes a standard inter-vehicle distance setting module 132, an effectiveness ratio setting module 134, a display control module 136, and a drive control module 138. Specifically, these modules are implemented by the microcomputer executing programs.

(Standard Inter-Vehicle Distance Setting Module 132)

Figure 6:
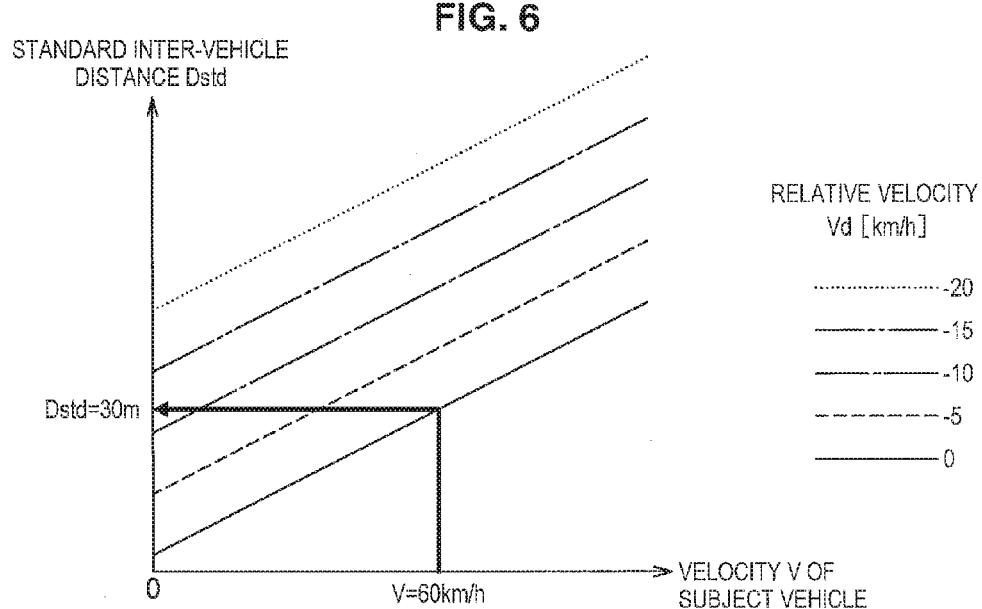
FIG. 6 illustrates a relationship between a velocity of a subject vehicle and a standard inter-vehicle distance according to the implementation.

The standard inter-vehicle distance setting module 132 sets a standard inter-vehicle distance Dstd in accordance with the velocity V of the subject vehicle and the relative velocity Vd. FIG. 6 illustrates an example in which the standard inter-vehicle distance setting module 132 sets the standard inter-vehicle distance Dstd in accordance with the velocity V of the subject vehicle and the relative distance Vd.

As discussed below, when an inter-vehicle distance is less than the standard inter-vehicle distance Dstd, suppression control is performed on the driving force in the present implementation. Thus, if the standard inter-vehicle distance setting module 132 sets the standard inter-vehicle distance Dstd at a large enough value, it is possible to begin to suppress the driving force in spite of, for example, the high velocity V of the subject vehicle or the high relative velocity Vd before sudden deceleration is necessary.

For example, as illustrated in FIG. 6, the standard inter-vehicle distance setting module 132 may set the standard inter-vehicle distance Dstd in a manner that the standard inter-vehicle distance Dstd increases if the relative velocity Vd is not changed, but the velocity V of the subject vehicle increases. Note that other relationships are also conceivable between the velocity V of the subject vehicle and the standard inter-vehicle distance Dstd. For example, if the relative velocity Vd is not changed, but the velocity V of the subject vehicle increases, the standard inter-vehicle distance setting module 132 may set the standard inter-vehicle distance Dstd in a manner that the standard inter-vehicle distance Dstd does not at least decrease. That is to say, the standard inter-vehicle distance setting module 132 may set the standard inter-vehicle distance Dstd by using the velocity V of the subject vehicle as a parameter in a manner that the standard inter-vehicle distance Dstd weakly increases.

The standard inter-vehicle distance setting module 132 may set the standard inter-vehicle distance Dstd in a manner that the standard inter-vehicle distance Dstd increases as the relative velocity Vd is increasing at the certain velocity V of the subject vehicle (i.e. the velocity of the subject vehicle is exceeding the velocity of the preceding vehicle) as illustrated in FIG. 6.

(Effectiveness Ratio Setting Module 134)

The effectiveness ratio setting module 134 sets the effectiveness ratio indicating the proportion of the amount of an accelerator operation by a driver to be reflected on drive control on the basis of the accelerator opening ratio Acc and an inter-vehicle distance difference Ddiff obtained by subtracting the standard inter-vehicle distance Dstd from the inter-vehicle distance D. FIG. 7 illustrates an example in which the effectiveness ratio setting module 134 sets the effectiveness ratio on the basis of the accelerator opening ratio Acc and the inter-vehicle distance difference Ddiff.

For example, the effectiveness ratio setting module 134 may set the effectiveness ratio at less than 100% when the inter-vehicle distance difference Ddiff has a negative value. Meanwhile, the effectiveness ratio setting module 134 may set the effectiveness ratio at 100% irrespective of the accelerator opening ratio when the inter-vehicle distance difference Ddiff is greater than or equal to 0. Such a configuration suppresses the driving force when the inter-vehicle distance D is less than the standard inter-vehicle distance Dstd. Meanwhile, when the inter-vehicle distance D is greater than or equal to the standard inter-vehicle distance Dstd, or when the subject vehicle maintains an enough inter-vehicle distance, the driving force is not suppressed, but the drivability can remain preferable.

The effectiveness ratio setting module 134 may set the effectiveness ratio in a manner that the effective ratio increases, or does not at least decrease as the inter-vehicle distance difference Ddiff is increasing at the certain accelerator opening ratio Acc as illustrated in FIG. 7. That is to say, the effectiveness ratio setting module 134 may set the effectiveness ratio by using the inter-vehicle distance difference as a parameter in a manner that the effectiveness ratio weakly increases. Such a configuration makes it easier to set a smaller effectiveness ratio and to suppress the driving force when the inter-vehicle distance difference Ddiff is smaller or when the inter-vehicle distance D is less than the standard inter-vehicle distance Dstd. Accordingly, it is advantageously easier to maintain an enough inter-vehicle distance.

The effectiveness ratio setting module 134 may set the effectiveness ratio in a manner that the effectiveness ratio increases or does not at least decrease as the accelerator opening ratio Acc is increasing with the constant inter-vehicle distance difference Ddiff as illustrated in FIG. 7. That is to say, the effectiveness ratio setting module 134 may set the effectiveness ratio by using the inter-vehicle distance difference as a parameter in a manner that the effectiveness ratio weakly increases. Specifically, when the accelerator opening ratio is greater than or equal to the threshold $\alpha$ ($\alpha A$ to $\alpha E$) set in advance in accordance with the inter-vehicle distance difference as illustrated in FIG. 7, the effectiveness ratio setting module 134 may set the effectiveness ratio at 100%. Additionally, a larger value may be set as the threshold $\alpha$ with a decrease in the inter-vehicle distance difference. Such a configuration makes it possible to stop suppression of the driving force when a driver clearly intends to accelerate the vehicle. Accordingly, the drivability is improved.

When the inter-vehicle distance difference Ddiff or the accelerator opening ratio Acc is small, the effectiveness ratio setting module 134 sets a smaller effectiveness ratio as illustrated in FIG. 7, but may set the effectiveness ratio at more than 0% at a minimum. Such a configuration makes a driver feel less strange than at an effectiveness ratio of 0%, improving the drivability.

(Display Control Module 136)

The display control module 136 causes the display 150 included in the vehicle 1 to display information on at least any one of the standard inter-vehicle distance, the inter-vehicle distance difference, and the effectiveness ratio. The display control module 136 according to the present implementation generates a display signal, and outputs the generated display signal to the display 150 to cause the display 150 to display an information presentation screen as illustrated in FIG. 8.

Figure 8:
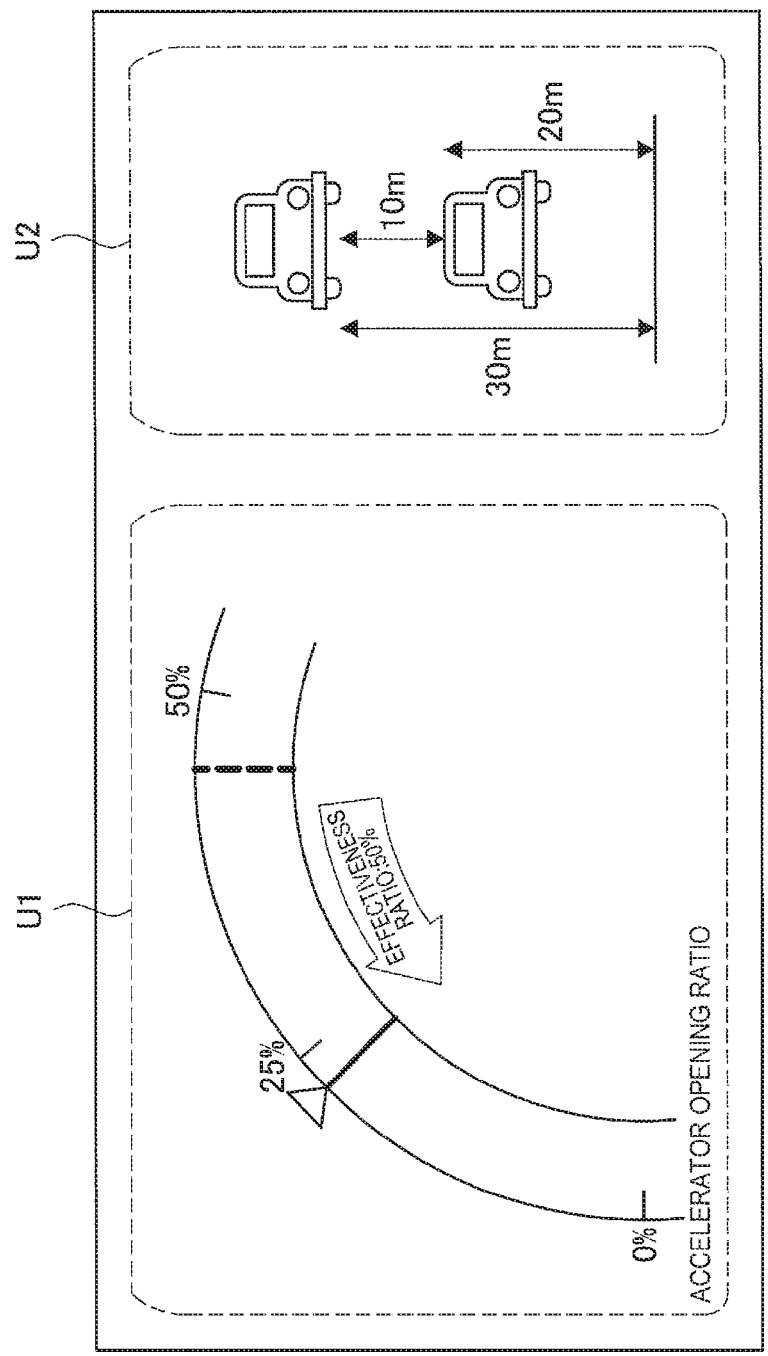
FIG. 8 illustrates an example of a screen displayed by a display according to the implementation.

FIG. 8 illustrates an example of an information presentation screen that the display control module 136 causes the display 150 to display when suppression control is performed on driving force in accordance with the present implementation. The information presentation screen illustrated in FIG. 8 includes an accelerator opening ratio display area U1 and an inter-vehicle distance display area U2. This example presupposes that the subject vehicle travels at a velocity of 60 km/h and an accelerator opening ratio of 45% with an inter-vehicle distance of 10 m to a preceding vehicle. FIG. 6 illustrates a standard inter-vehicle distance of 30 m, and an inter-vehicle distance difference Ddiff of −20 m (=an inter-vehicle distance of 10 m−a standard inter-vehicle distance of 30 m). Thus, an effectiveness ratio of 50% is acquired as illustrated in FIG. 7.

The dashed line represents an accelerator opening ratio (45%) in the accelerator opening ratio display area U1, while the solid line represents a control accelerator opening ratio (22.5%). An effectiveness ratio is also displayed in the accelerator opening ratio display area U1. Displaying the effectiveness ratio advantageously facilitates a driver to understand that the control accelerator opening ratio for computing driving force is suppressed as compared with the accelerator opening ratio, especially when the effectiveness ratio is less than 100%.

The subject vehicle and a preceding vehicle are displayed in the inter-vehicle distance display area U2, and information on the current inter-vehicle distance (10 m in FIG. 8), the standard inter-vehicle distance (30 m in FIG. 8), and the inter-vehicle distance difference (20 m in FIG. 8. A positive value is used here to facilitate the driver's understanding.) is also displayed. Displaying the information on the inter-vehicle distance, the standard inter-vehicle distance, or the inter-vehicle distance difference advantageously facilitates the driver to understand why the driving force is suppressed, especially when the effectiveness ratio is less than 100%.

(Drive Control Module 138)

The drive control module 138 performs drive control on the subject vehicle on the basis of the effectiveness ratio. For example, the drive control module 138 according to the present implementation computes the control accelerator opening ratio by multiplying the accelerator opening ratio by the effectiveness ratio, and computes the desired value (desired driving force) of the driving force output by the engine 55 and the motor generator 74 in accordance with the control accelerator opening ratio. The drive control according to an implementation of the present disclosure based on the effectiveness ratio is not, however, limited thereto. For example, the drive control module 138 may perform drive control by reflecting the effectiveness ratio on the desired driving force, the desired engine speed, or the desired acceleration.

3. OPERATION

The above describes the configurations of the SC-CU 110 and the HEV-CU 130 included in the vehicle 1 according to the present implementation. Next, drive control processing according to the present implementation will be described. Note that the following drive control processing may be regularly performed or repeated once the previous drive control processing ends.

3-1. Basic Routine

FIG. 9 is a flowchart illustrating an example of the drive control processing according to the present implementation. First of all, it is determined whether or not the control switch 30 is on (S100). If the control switch 30 is off (S100: NO), the drive control module 138 of the HEV-CU 130 computes the desired driving force in accordance with the current accelerator opening ratio (S170) and finishes the drive control processing.

If the control switch 30 is on (S100: YES), the inter-vehicle distance measuring module 114 of the SC-CU 110 computes the inter-vehicle distance D to a preceding vehicle on the basis of information on images captured by the stereo camera assembly 20 (S110). If the preceding vehicle detecting module 112 has detected no preceding vehicle, the inter-vehicle distance D is set at an infinite value or a predetermined extremely large value. Next, the relative velocity computing module 116 of the SC-CU 110 computes the relative velocity on the basis of a change in the inter-vehicle distance D over time (S120).

The standard inter-vehicle distance setting module 132 of the HEV-CU 130 then computes the standard inter-vehicle distance Dstd on the basis of the velocity V of the subject vehicle and the inter-vehicle distance D (S130). The effectiveness ratio setting module 134 of the HEV-CU 130 sets the effectiveness ratio on the basis of the standard inter-vehicle distance Dstd, the inter-vehicle distance D, and the accelerator opening ratio Acc (S140). The effectiveness ratio set in step S140 will be described below in detail. The display control module 136 of the HEV-CU 130 further generates a display signal, and causes the display 150 to display, for example, information on the standard inter-vehicle distance, the inter-vehicle distance difference, and the effectiveness ratio (S150).

Next, the drive control module 138 of the HEV-CU 130 computes the control accelerator opening ratio by multiplying the accelerator opening ratio by the effectiveness ratio (S160). Finally, the drive control module 138 of the HEV-CU 130 computes the desired driving force in accordance with the control accelerator opening ratio (S170), and finishes the drive control processing.

3-2. Effectiveness Ratio Setting Routine

The drive control processing according to the present implementation has been described so far. The following describes, in detail with reference to FIG. 10, the effectiveness ratio setting processing (step S140 in FIG. 9) performed by the effectiveness ratio setting module 134 of the HEV-CU 130 in the course of the drive control processing. FIG. 10 illustrates the effectiveness setting processing.

First of all, the effectiveness ratio setting module 134 of the HEV-CU 130 determines whether or not the inter-vehicle distance difference Ddiff obtained by subtracting the standard inter-vehicle distance Dstd from the inter-vehicle distance D has a negative value (S142). If the inter-vehicle distance difference Ddiff has a negative value (S142: YES), the threshold $\alpha$ set in advance in accordance with the inter-vehicle distance difference is compared with the accelerator opening ratio Acc (S144).

If the threshold $\alpha$ is greater than the accelerator opening ratio Acc (S144: YES), the effectiveness ratio setting module 134 of HEV-CU 130 sets an effectiveness ratio of less than 100% in accordance with the accelerator opening ratio Acc and the inter-vehicle distance difference Ddiff.

To the contrary, if the inter-vehicle distance difference is greater than or equal to 0 (S142: NO), or if the accelerator opening ratio Acc is greater than or equal to the threshold $\alpha$ (S144: NO), the effectiveness ratio setting module 134 of the HEV-CU 130 sets the effectiveness ratio at 100% (S148).

4. CONCLUSION

According to the present implementation as described above, driving force is controlled on the basis of the velocity of the subject vehicle and the inter-vehicle distance to a preceding vehicle, so that it is possible to prevent the energy consumption efficiency of the vehicle from decreasing due to repeated acceleration and sudden deceleration. According to the present implementation, when a driver clearly intends to accelerate the vehicle, the HEV-CU 130 stops suppression of the driving force. Accordingly, the drivability can be improved.

Although the preferred implementation of the present disclosure has been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, an example of the hybrid vehicle including the engine 55 and the motor generator 74 as the drive sources has been described in the above-described implementation, but the present disclosure is not limited to such an example. For example, even a vehicle including only a motor generator as the drive source or a vehicle including only an engine as the drive source can achieve the present disclosure by reflecting the effectiveness ratio in the course of the drive control.

An example in which a driver switches the control switch 30 on/off to decide whether to compute and reflect the effectiveness ratio has been described in the above-described implementation, but the present disclosure is not limited to such an example. For example, the vehicle 1 capable of performing adaptive cruise control (ACC) does not have to compute and reflect the effectiveness ratio while the adaptive cruise control is performed, but may compute and reflect the effectiveness ratio while the adaptive cruise control is not performed.

An example in which the preceding vehicle detecting module 112, the inter-vehicle distance measuring module 114, and the relative velocity computing module 116 are configured as respective modules of the SC-CU 110, which processes images captured by the stereo camera assembly 20 has been described in the above-described implementation, but the present disclosure is not limited to such an example. For example, a preceding vehicle may be detected, and the inter-vehicle distance and the relative velocity may be acquired on the basis of information acquired through an onboard millimeter wave radar, vehicle-to-vehicle communication, and an intelligent transport system (ITS).

An example in which the SC-CU 110 includes the relative velocity computing module 116, and the HEV-CU 130 includes the standard inter-vehicle distance setting module 132, the effectiveness ratio setting module 134, the display control module 136, and the drive control module 138 has been described in the above-described implementation, but the present disclosure is not limited to such an example. The functions of the respective modules may be implemented by the other control units such as the ECU 50, the TCU 60, and the MCU 70 executing programs.

The respective steps described herein do not necessarily have to be chronologically processed in the order described as the flowcharts. For example, the respective steps in the drive control processing may be processed in order different from that of the flowcharts or processed in parallel.

The invention claimed is:

1. A vehicle control device, comprising:
a standard inter-vehicle distance setting module configured to set a standard inter-vehicle distance based on a first velocity of a subject vehicle that includes the vehicle control device;
an inter-vehicle distance measuring module configured to measure an inter-vehicle distance between the subject vehicle and an immediately preceding vehicle;
an effectiveness ratio setting module configured to set an effectiveness ratio based on an inter-vehicle distance difference between the standard inter-vehicle distance and the inter-vehicle distance,
wherein the effectiveness ratio indicates a proportion of an amount of an accelerator operation by a driver to be reflected on a drive of the subject vehicle; and
a drive control module configured to control the drive of the subject vehicle based on the effectiveness ratio.

2. The vehicle control device according to claim 1, wherein the effectiveness ratio setting module is further configured to set, based on the inter-vehicle distance that has a negative value, the effectiveness ratio to a first value that is less than 100%,
wherein the first value varies linearly based on the inter-vehicle distance difference.

3. The vehicle control device according to claim 1, wherein the effectiveness ratio setting module is further configured to set the effectiveness ratio at 100% based on an accelerator opening ratio of an accelerator pedal of the subject vehicle that is greater than or equal to a value set based on the inter-vehicle distance difference.

4. The vehicle control device according to claim 2, wherein the effectiveness ratio setting module is further configured to set the effectiveness ratio at 100% based on an accelerator opening ratio of an accelerator pedal of the subject vehicle that is greater than or equal to a value set based on the inter-vehicle distance difference.

5. The vehicle control device according to claim 1, further comprising:
a relative velocity computing module configured to compute a relative velocity between the subject vehicle and the immediately preceding vehicle,
wherein the standard inter-vehicle distance setting module is further configured to set the standard inter-vehicle distance based on the first velocity of the subject vehicle and the computed relative velocity.

6. The vehicle control device according to claim 5, wherein the standard inter-vehicle distance setting module is further configured to set the standard inter-vehicle distance such that the standard inter-vehicle distance increases based on the first velocity of the subject vehicle that exceeds a second velocity of the immediately preceding vehicle.

7. The vehicle control device according to claim 1, wherein the drive control module is further configured to control, based on the effectiveness ratio, at least one of an accelerator opening ratio of an accelerator pedal of the subject vehicle, a driving force of the subject vehicle, a desired engine speed of the subject vehicle, or an acceleration of the subject vehicle.

8. The vehicle control device according to claim 1,
wherein the subject vehicle further includes a display device, and
wherein the vehicle control device further comprises a display control module configured to control the display device to display information related to at least one of the standard inter-vehicle distance, the inter-vehicle distance difference, or the effectiveness ratio.

9. The vehicle control device according to claim 1, wherein the effectiveness ratio setting module is further configured to set the effectiveness ratio to a value that increases based on the inter-vehicle distance difference.

10. The vehicle control device according to claim 1, wherein the effectiveness ratio setting module is further configured to set the effectiveness ratio to a value that increases based on an accelerator opening ratio of an accelerator pedal of the subject vehicle.

11. The vehicle control device according to claim 1, wherein the standard inter-vehicle distance setting module is further configured to set the standard inter-vehicle distance to a value that increases based on the first velocity of the subject vehicle.

12. The vehicle control device according to claim 1, wherein the inter-vehicle distance measuring module is further configured to measure the inter-vehicle distance based on at least one image captured by a camera.

13. A vehicle control method, comprising:
in a vehicle control device comprising a standard inter-vehicle distance setting module, an inter-vehicle distance measuring module, an effectiveness ratio setting module, and a drive control module:

setting, by the standard inter-vehicle distance setting module, a standard inter-vehicle distance based on a velocity of a subject vehicle that includes the vehicle control device;

measuring, by the inter-vehicle distance measuring module, an inter-vehicle distance between the subject vehicle and an immediately preceding vehicle;

setting, by the effectiveness ratio setting module, an effectiveness ratio based on an inter-vehicle distance difference between the standard inter-vehicle distance and the inter-vehicle distance and an acceleration opening ratio of an accelerator pedal of the subject vehicle, wherein the effectiveness ratio indicates a proportion of an output to a user input; and controlling, by the drive control module, a drive of the subject vehicle based on the effectiveness ratio.

* * * * *